(12) United States Patent
Atlan

(10) Patent No.: US 12,400,282 B1
(45) Date of Patent: Aug. 26, 2025

(54) SYSTEM AND METHOD FOR REAL ESTATE VIEW FINDER APPLICATION

(71) Applicant: Elizabeth Atlan, Miami Beach, FL (US)

(72) Inventor: Elizabeth Atlan, Miami Beach, FL (US)

( * ) Notice: Subject to any disclaimer, the term of this patent is extended or adjusted under 35 U.S.C. 154(b) by 0 days.

(21) Appl. No.: 18/741,369

(22) Filed: Jun. 12, 2024

Related U.S. Application Data

(63) Continuation of application No. 18/438,390, filed on Feb. 9, 2024, now abandoned.

(60) Provisional application No. 63/444,399, filed on Feb. 9, 2023.

(51) Int. Cl.
*G06Q 50/16* (2024.01)
*G06T 19/00* (2011.01)

(52) U.S. Cl.
CPC ........... *G06Q 50/16* (2013.01); *G06T 19/006* (2013.01)

(58) Field of Classification Search
CPC ...... G06Q 50/16; G06Q 50/265; G06N 20/00; G06T 19/06
See application file for complete search history.

(56) References Cited

U.S. PATENT DOCUMENTS

| | | | |
|---|---|---|---|
| 8,718,612 B2 | 5/2014 | Calman et al. | |
| 9,418,377 B2 | 8/2016 | Kardell | |
| 10,963,952 B2 | 3/2021 | Born et al. | |
| 11,044,393 B1 | 6/2021 | Suiter et al. | |
| 11,113,767 B1 | 9/2021 | Davis et al. | |
| 2013/0328931 A1 | 12/2013 | Wolcott et al. | |
| 2014/0129387 A1* | 5/2014 | Kardell | G06Q 30/0641 705/26.61 |
| 2015/0206218 A1* | 7/2015 | Banerjee | G06Q 30/0623 705/26.61 |
| 2018/0158156 A1 | 6/2018 | Dintenfass | |
| 2018/0196819 A1 | 7/2018 | Zhang | |
| 2020/0219214 A1 | 7/2020 | Isgar | |
| 2022/0129992 A1 | 4/2022 | Engelhorn et al. | |
| 2022/0189075 A1* | 6/2022 | Lynch | G06T 11/00 |

(Continued)

FOREIGN PATENT DOCUMENTS

| | | | |
|---|---|---|---|
| KR | 20120042306 A | 5/2012 | |
| KR | 101693631 B1 | 1/2017 | |

(Continued)

OTHER PUBLICATIONS

Patil, Vedika, Sonali Sathe, and Milind Kamble Aprajita. "Augmented reality for real estate." International Research Journal of Engineering and Technology 9.1 (2022): 837-843.*

*Primary Examiner* — Sarah M Monfeldt
*Assistant Examiner* — Don Edmonds
(74) *Attorney, Agent, or Firm* — Bold IP, PLLC; Christopher Mayle

(57) ABSTRACT

A system and method for an application that would accomplish a real estate search through real estate listings, specific buildings, and their availability to the potential client and the real estate agent, whereby the system would fast track the end user with immediate information of an area (neighborhood, statistics of a specific building, pricing, availability, etc.) through augmented reality and then can link them directly with an agent to request more information and to create a new lead through a video system or audio system without having to leave the application.

10 Claims, 6 Drawing Sheets

(56) References Cited

U.S. PATENT DOCUMENTS

2022/0319119 A1* 10/2022 Bhogale .............. G06Q 10/083
2022/0405340 A1* 12/2022 Kirkwood ............ G06F 16/904
2023/0005198 A1* 1/2023 Lotto .................. G06Q 10/109

FOREIGN PATENT DOCUMENTS

KR          101921743 B1    2/2019
WO       2018117292 A1    6/2018

* cited by examiner

SYSTEM AND METHOD FOR REAL ESTATE VIEW FINDER APPLICATION

CROSS RELATED APPLICATIONS

This application claims priority to U.S. patent application Ser. No. 18/438,390 filed on Feb. 9, 2024, which claims priority to U.S. Provisional Patent Application No. 63/444,399 filed on Feb. 9, 2023, which is incorporated in its entirety.

FIELD OF DISCLOSURE

The overall field of this invention is directed to a system and method for an interactive virtual environment. More particularly, the invention relates to an all-inclusive real estate application for real estate listings which superimposes property information over a live augmented reality view of a property and is connected to various third-party systems for communication with real estate agents.

BACKGROUND

Real estate agents are constantly working to close the need for people to have a comfortable place to live, and people are in an unstoppable search for a real estate listing. Before augmented reality was used in real estate, real estate stood firm on the principle of location visits. Unfortunately, this took time and, most often, additional costs spent on covering the distance and staying near the location if it was located far from home. Customers and realtors book the extended periods in their calendars to look at the chosen structures.

Augmented Reality (AR) in real estate applies advanced visualization to represent real-world environments, such as apartments, houses, and offices. In other words, the use of AR allows prospective buyers of real estate to visit the property in 3D. This approach saves real estate agents and interested customers time and money. Often, the deals are not getting closed because of issues that could have been detected in the earlier stages. This is where AR in real estate comes to aid. The technology helps the real estate industry show the apartments or houses to the customers using real-time visualizations. When customers see augmented reality locations, they can better understand how comfortable living in them will be, which heavily influences their choice. However, many of the current AR programs lack various features to accommodate multiple dwellings and do not connect the users directly to the real estate agents and thus a new and improved system is needed.

SUMMARY

The present invention provides a system and method that starts at the very first step of the search process for real estate listings, in which the user may scan and highlight their surroundings and where each building in view will be highlighted in an augmented reality view. The viewer may then touch the screen on a user interface to access the building data that has been linked with an existing Real Estate platform or has data from a third-party source. Once combined with the existing Real Estate search platform, the complete capabilities of the application may be recognized.

In some aspects, the techniques described herein relate to an interactive real estate system, including: at least one processor; a communication interface, controlled by the at least one processor, to communicate with a computing device; and a memory having stored therein machine executable instructions, that when executed by the at least one processor, causes the interactive real estate system to: receive a collection of user information generated from an application in the computing device of a user, the collection of user information including information generated by a location module associated with the application; determine a context-based information from the collection of user information, the context-based information generated based at least on a search criteria of the user; provision of the context-based information in an augmented reality view through a user interface of the computing device in the application; and facilitate rendering of an interactive location matching the search criteria to be displayed in the augmented reality view through the user interface of the computing device, wherein rendered virtual objects pertaining to the interactive location are shown in the augmented reality view through the user interface of the computing device.

In some aspects, the techniques described herein relate to an interactive real estate system, wherein the interactive real estate system is further caused to: present in the augmented reality view through the user interface of the computing device an invitation to join one or more interactive events corresponding to the interactive location; and connecting the user to the one or more interactive events.

In some aspects, the techniques described herein relate to an interactive real estate system, wherein the interactive real estate is further caused to: providing a toggle to change a viewing landscape in the augmented reality view between a first view, a second view, and a third view.

In some aspects, the techniques described herein relate to an interactive real estate system, wherein the first view is a general user tourist mode showing neighborhood points of interest.

In some aspects, the techniques described herein relate to an interactive real estate system, wherein the second view shows locations matching the search criteria.

In some aspects, the techniques described herein relate to an interactive real estate system, wherein the third view shows all locations on a market.

In some aspects, the techniques described herein relate to an interactive real estate system, wherein the interactive real estate is further caused to: connecting the user to a third-party platform with a real estate agent; and providing a conference between the user and the real estate agent using one or more video and audio modules.

In some aspects, the techniques described herein relate to an interactive real estate system, wherein the interactive real estate is further caused to: facilitate rendering of a second interactive location matching the search criteria that is not directly visible, by the user, with one or more indicators in the augmented reality view through the user interface of the computing device.

In some aspects, the techniques described herein relate to an interactive real estate system, wherein the interactive real estate is further caused to: automatically storing data corresponding to the interactive location on a user profile of the user for later viewing.

In some aspects, the techniques described herein relate to an interactive real estate system, wherein the later viewing is available offline.

In some aspects, the techniques described herein relate to an interactive real estate system, wherein the interactive real estate is further caused to: transmitting an alert that will sound on the computing device any time there is a new match for the search criteria within a predetermined radius.

In some aspects, the techniques described herein relate to an interactive real estate system, wherein the interactive real estate is further caused to: generating alternative artificial views of the interactive location in response to one or more settings by the user.

In some aspects, the techniques described herein relate to an interactive real estate system, wherein the interactive real estate is further caused to: automatically saving the search criteria for next viewing.

In some aspects, the techniques described herein relate to an interactive real estate system, wherein the interactive real estate is further caused to: saving multiple search criteria for toggling views.

In some aspects, the techniques described herein relate to an interactive real estate system, wherein the rendered virtual objects include status indicators including active (sale), active (rent), sold (sale), and sold (rent).

In some aspects, the techniques described herein relate to an interactive real estate system, wherein the rendered virtual objects include general information including name, address, number of units, and price.

In some aspects, the techniques described herein relate to an interactive real estate system, wherein the interactive real estate is further caused to: presenting a calendar interface after selecting the interactive location to set up a future meeting with a real estate agent pertaining to that property.

In some aspects, the techniques described herein relate to an interactive real estate system, wherein the interactive real estate is further caused to: generating an automated advertisement procedure based on a location of the user.

In some aspects, the techniques described herein relate to a method for interactive real estate system, the method including: receive a collection of user information generated from an application in a computing device of a user, the collection of user information including information generated by a location module associated with the application; determine a context-based information from the collection of user information, the context-based information generated based at least on a search criteria of the user; provision the context-based information in an augmented reality view through a user interface of the computing device in the application; and facilitate rendering of an interactive location matching the search criteria to be displayed in the augmented reality view through the user interface of the computing device, wherein rendered virtual objects pertaining to the interactive location are shown in the augmented reality view through the user interface of the computing device.

In some aspects, the techniques described herein relate to a method, further including, connecting the user to a third-party real estate platform with a real estate agent; and providing a conference between the user and the real estate agent using one or more video and audio modules without leaving the application.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
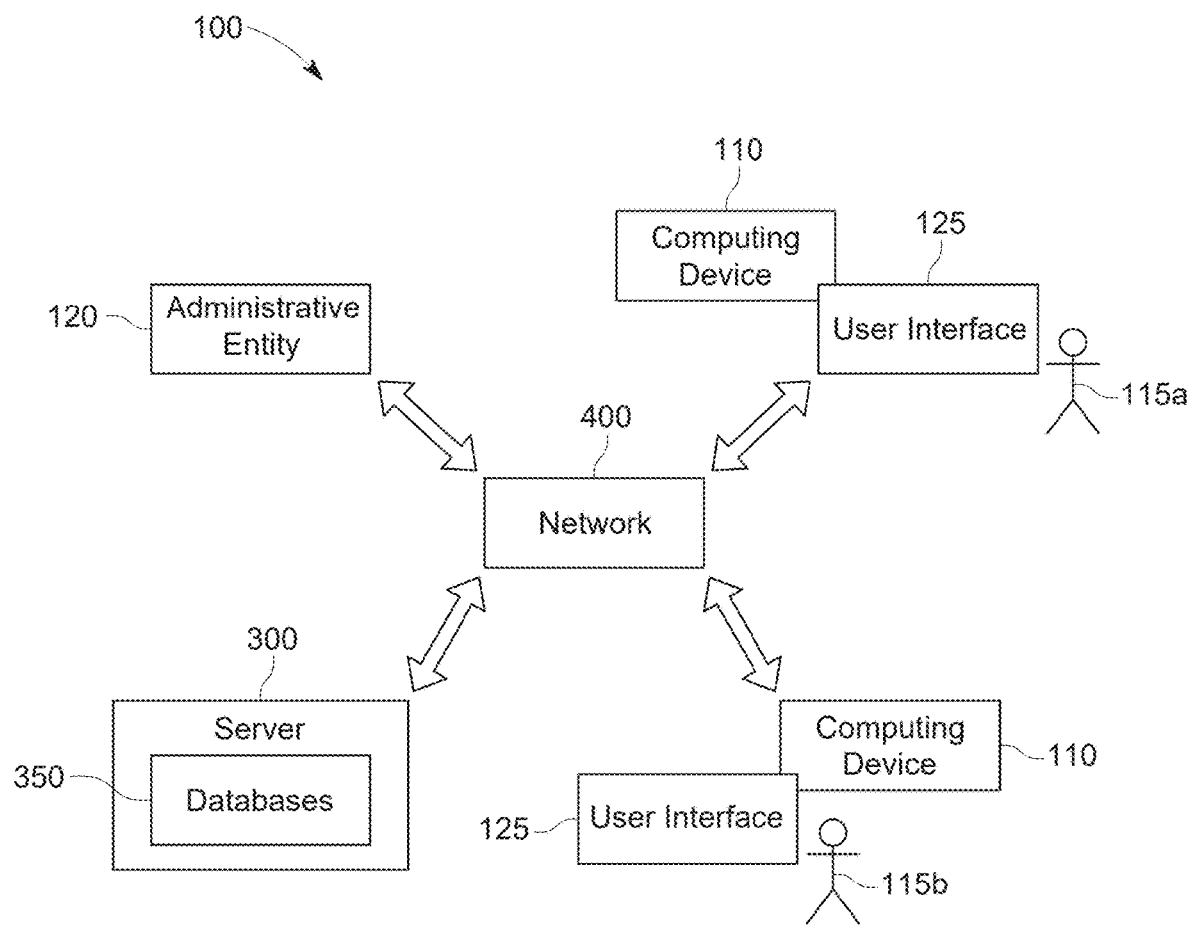
FIG. 1 shows a block diagram of the various systems of the real estate system.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skills in the art to which this disclosure pertains.

The present disclosure recognizes the unsolved need for an improved system and method for an application that would accomplish a real estate search through real estate listings, specific buildings, and their availability to the potential client and the real estate agent. The technology would be valuable for any brokerage because it would be a natural and immediate link in real-time with clients and agents. Real estate agents are always trying to find new leads and this is an extremely valuable tool for a brokerage to have. This would fast track the end user with immediate information of an area (neighborhood, statistics of a specific building, pricing, availability, etc.) through augmented reality and then can link them directly with an agent to request more information and to create a new lead through a video system or audio system without having to leave the application. The real estate may be any type of building, location, or property which may all be used interchangeably throughout this patent application.

There are several benefits to viewing real estate in augmented reality (AR) or virtual reality (VR). The combination of AR and VR allows potential buyers to view properties from anywhere at their convenience without the need to physically visit the location. This can save time and money, especially for buyers who are located far from the property. Enhanced visualization by augmented reality (AR) can provide a more immersive and interactive experience, allowing buyers to get a better sense of the property and its features.

AR and VR offer increased accuracy and can help buyers get a more accurate representation of the property as it can show the true size and layout of rooms and features. This can help buyers make more informed decisions about whether a property is right for them. AR and VR can help buyers view properties with enhanced safety as it allows them to do so from a distance such as in their vehicle or at home, reducing the need for in-person showings during the COVID-19 pandemic or other times when it may not be safe to physically visit a property. Overall, viewing real estate in AR and VR can provide a more convenient, immersive, and accurate experience for potential buyers, and can help them make informed decisions about whether a property is right for them. The system may also provide interior videos and images of properties once selected.

The present invention is designed to be user friendly and can be used not only for those searching for real estate but also for those curious of their surroundings, potentially exposing users to more real estate and a particular brokerage, creating potential clients and ad revenue from participating restaurants, events, and local venues that are within the application when connected to third party real estate applications. During operation, the application scans surroundings using GPS/location of the user and building recognition. Once combined with the existing Real Estate search platform, the complete capabilities of the application will be recognized.

Turning to FIG. 1, FIG. 1 depicts a block diagram of an embodiment of the present invention for a real estate system 100. Real estate system 100 may include a plurality of computing devices 110. Computing devices 110 may be utilized by a series of users such as users 115, including user 115*a* and 115*b*. Further, computing devices 110 and users 115 may be located in various geographical locations that are either located apart or are located in proximity to each other. Computing devices 110 may be any combination of devices including a phone, tablet, television, desktop computer, laptop computer, gaming system, and wearable device electronic glasses. In some embodiments, computing devices 110 may be an electronic pair of glasses or smart glasses that are capable of reflecting projected digital images as well as allowing the user to see the real world, thus being able to view both simultaneously. In some embodiments, the computing device 110 may be a mobile phone capable of displaying an augmented reality view through a camera, sensor, or other method.

Computing device 110 may include local wireless circuitry which would enable short-range communication to another user computing device as well as Bluetooth sensors and NFC chips. The local wireless circuitry may communicate on any wireless protocol, such as infrared, Bluetooth, IEEE 802.11, or other local wireless communication protocol.

Computing device 110 may have one or more communication ports coupled to the circuitry to enable a wired communication link to another device, such as but not limited to another wireless communications device including a laptop or desktop computer, television, video console, speaker, smart speaker, or voice assistant such as Alexa Echo®. The communication link may enable communication between computing device 110 and other devices by way of any wired communication protocol, such as USB wired protocol, RS-232, or some proprietary protocol. Computing device 110 may have a global positioning system (GPS) unit coupled to the circuitry to provide location information to the circuitry whereby the GPS may provide the location information related to the location of computing device 110 as known by those of ordinary skill in the art.

Computing device 110 may communicate with other devices via communication links, such as USB (Universal Serial Bus) or HDMI/VGA (High-Definition Multimedia Interface/Video Graphics Array). Computing device 110 may include voice recognition capable software that may be used to navigate or issue instructions as well as fingerprint recognition software, optical scanners, optical pointers, digital image capture devices, and associated interpretation software. Computing device 110 may utilize additional Input Devices 265 and Other I/O 275 in the form of examples such as a speaker, smart speaker, microphone, headphone jack, indicator lights, and vibrational motor.

In some embodiments, computing devices 110 may be in communication with one or more servers, such as server 300 over one or more networks such as network 400. Server 300 may be located at a data center, or any other location suitable for providing service to network 400 whereby server 300 may be in one central location or in many different locations in multiple arrangements. Server 300 may comprise a database server such as MySQL® or Maria DB® server. Server 300 may have an attached data storage system storing software applications and data. Server 300 may have a number of modules that provide various functions related to real estate system 100. Modules may be in the form of software or computer programs that interact with the operating system of server 300 whereby data collected in databases as instruction-based expressions of components and/or processes may be processed by one or more processors within server 300 as well as in conjunction with execution of one or more other computer programs. Modules may be configured to receive commands or requests from user computing devices 110, server 300, and outside connected devices over network 400. Server 300 may comprise components, subsystems, and modules to support one or more management services for real estate system 100.

Modules may be configured to receive commands or requests from computing devices 110 and communicate appropriate responses to requesting computing devices. Servers 300 may have a control module with appropriate firmware or software and an operating system to control overall operation and configuration of the real estate system 100. The control module may be operable to communicate with a network interface module which provides interface functionality over one or more networks (wired or wireless) and possibly connectivity with other communication media.

The control module may also communicate with an audio module and a video module which receive and process audio and video data, respectively, from computing devices 110 of users to computing devices of real estate agents that may appear on the user interface while viewing real estate in augmented reality overlaid or in a separate window. The audio module may include, among other modules or components for processing audio data, speech detection and recognition modules and codecs for processing incoming or outgoing video data. A speech detection module can be configured to detect instances of speech at a site (for example, to trigger recording or other functions of real estate system 100), and/or determine the relative physical location of the detected speech for use in controlling the operation of individual microphones at the site. Speech recognition may be used to distinguish between individual voices for the purpose of filtering out another voice.

The video module may include image recognition modules for use in detecting speech or distinguishing between the real estate agent and user 115 and appropriate codecs for use in processing incoming or outgoing video data. The image recognition modules may include face tracking or pattern recognition algorithms. The audio and video modules may also include, respectively, interfaces for data communication between input units such as microphones and cameras, and output units such as speakers and display screens. The selection and implementation of appropriate speech and video modules, including codecs and speech detection/recognition modules, image recognition modules, including appropriate encoding, decoding, and compression algorithms, are those understood by those of ordinary skill in the art. Real estate system 100 may also be equipped with security modules providing end-to-end security with other systems and intermediate host systems.

Server 300 may have a creation module. The creation module may be configured so that users can interact with the augmented reality view of an area by inserting annotations, comments, virtual objects, pictures, audio, and video to locations within range of the device. The virtual objects may include virtual characters or static virtual objects and any other virtual objects that can be rendered by the augmented reality networking system. These interactions may be viewed by other users 115 who may also build upon the interactions or make additional interactions that then may be seen by the original user or a third user.

In one or more non-limiting embodiments, network 400 may include a local area network (LAN), such as a company Intranet, a metropolitan area network (MAN), or a wide area network (WAN), such as the Internet or World Wide Web. Network 400 may be a private network or a public network, or a combination thereof. Network 400 may be any type of network known in the art, including a telecommunications network, a wireless network (including Wi-Fi), and a wireline network. Network 400 may include mobile telephone networks utilizing any protocol or protocols used to communicate among mobile digital user computing devices (e.g., computing device 110), such as GSM, GPRS, UMTS, AMPS, TDMA, or CDMA. In one or more non-limiting embodiments, different types of data may be transmitted via network 400 via different protocols. In alternative embodiments, computing devices 110 may act as standalone devices or they may operate as peer machines in a peer-to-peer (or distributed) network environment.

Network 400 may further include a system of terminals, gateways, and routers. Network 400 may employ one or more cellular access technologies including 2nd (2G), 3rd (3G), 4th (4G), 5th (5G), LTE, Global System for Mobile communication (GSM), General Packet Radio Services (GPRS), Enhanced Data GSM Environment (EDGE), and other access technologies that may provide for broader coverage between user computing devices if, for instance, they are in a remote location not accessible by other networks.

Figure 2:
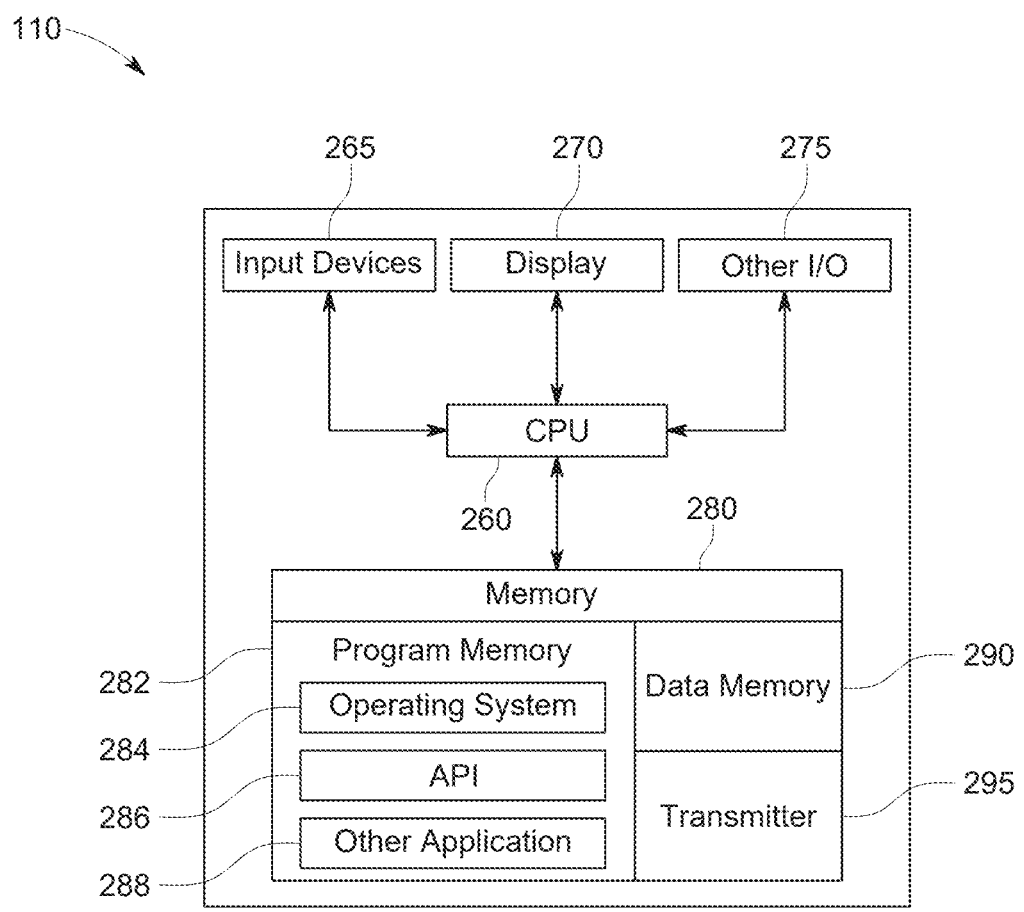
FIG. 2 shows a block diagram of the computing device
Figure 3:
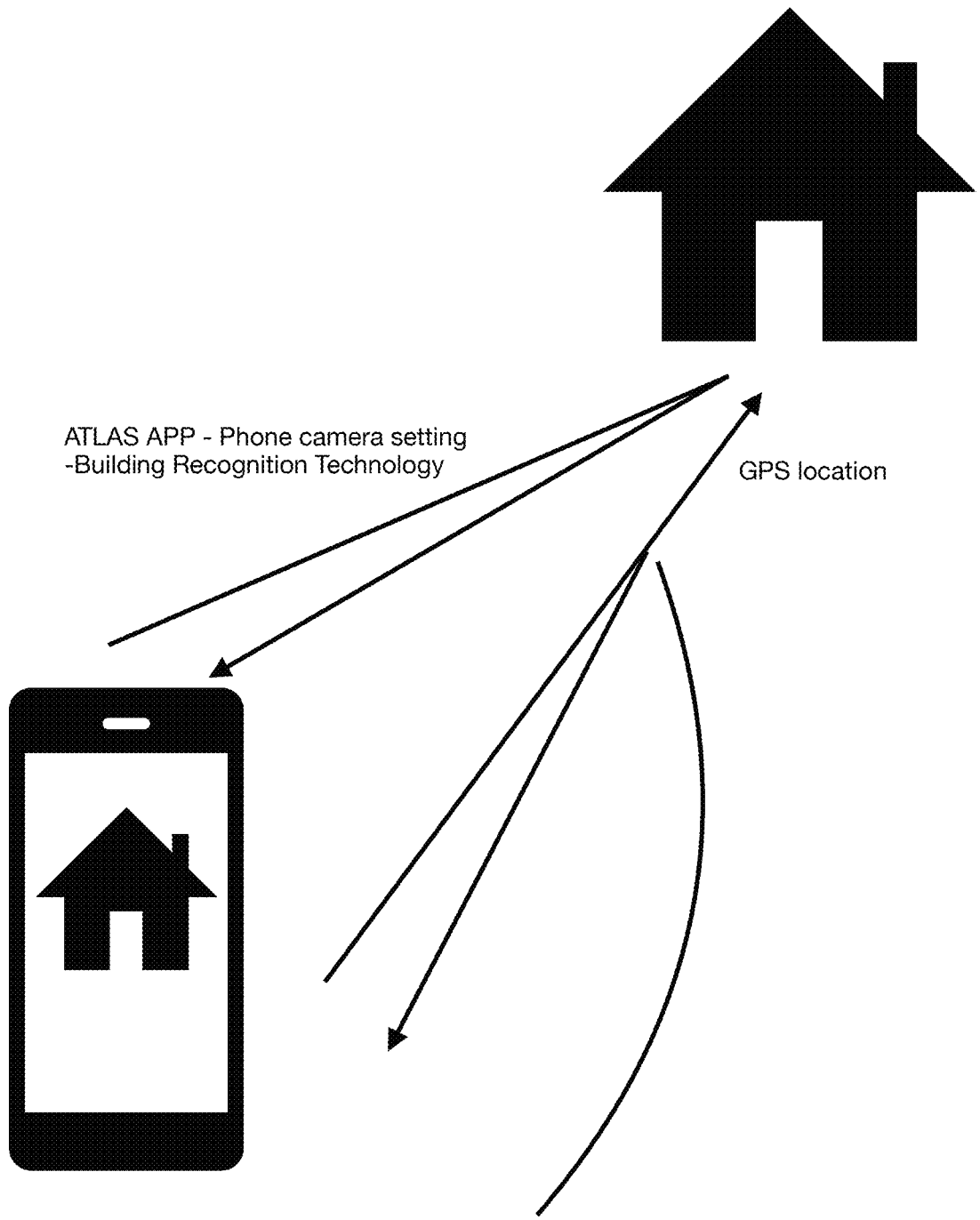
FIG. 3 illustrates the user interface and steps of the real estate system.
Figure 4:
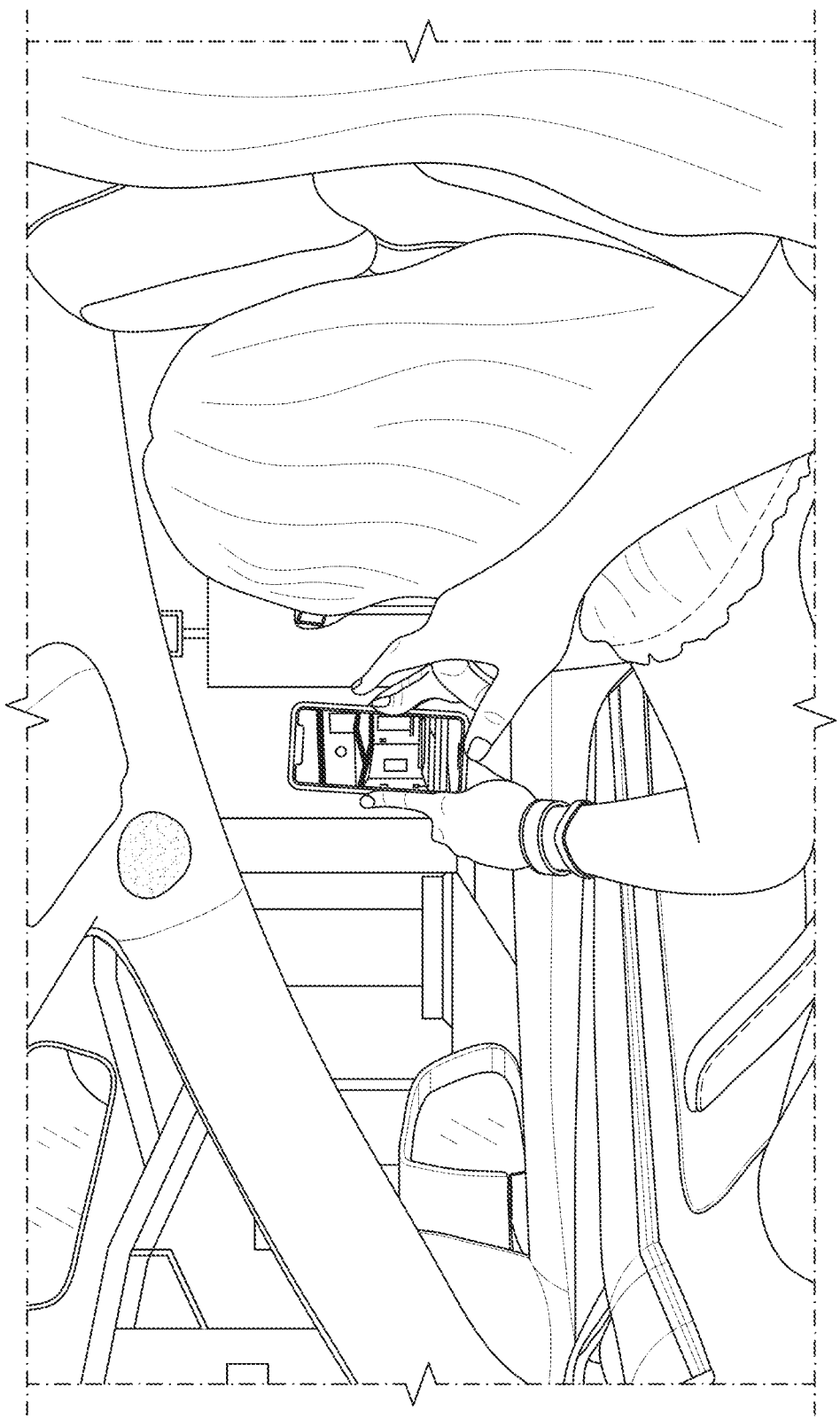
FIG. 4 illustrates the user interface and steps of the real estate system.
Figure 5:
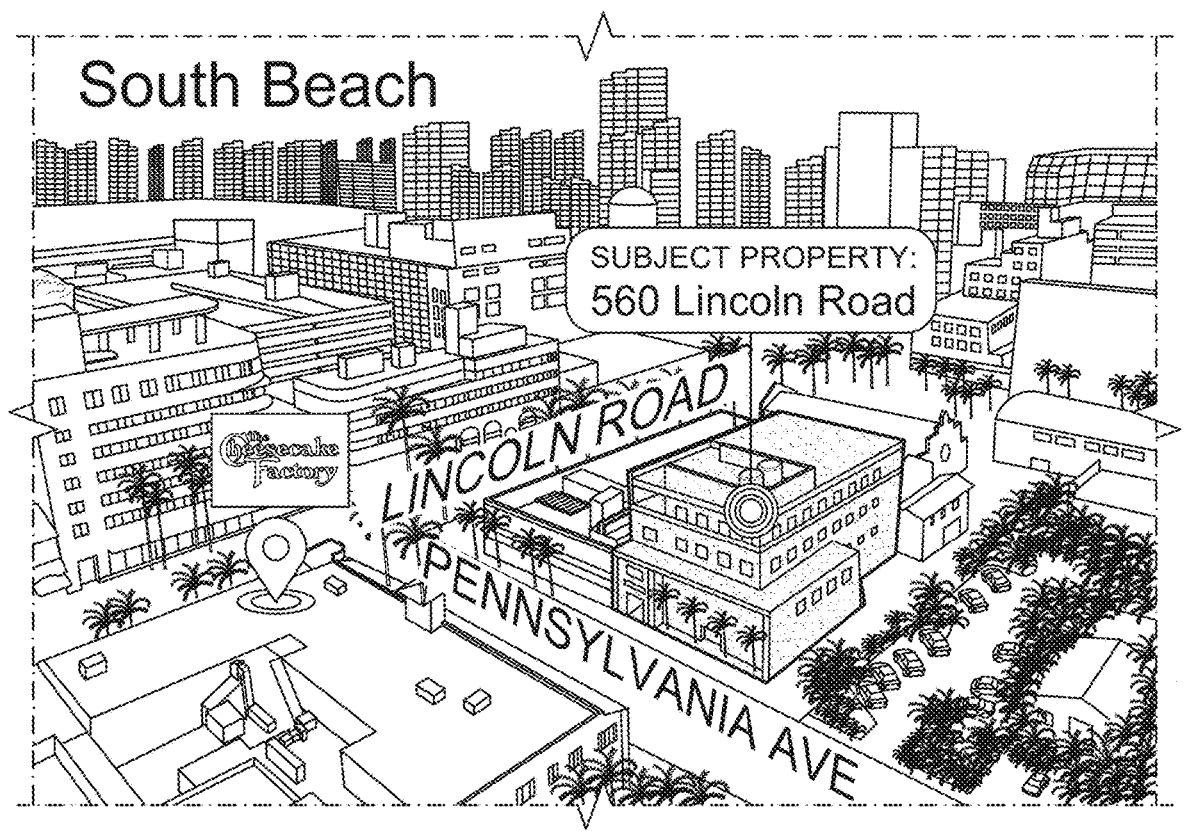
FIG. 5 illustrates the user interface and steps of the real estate system.
Figure 6:
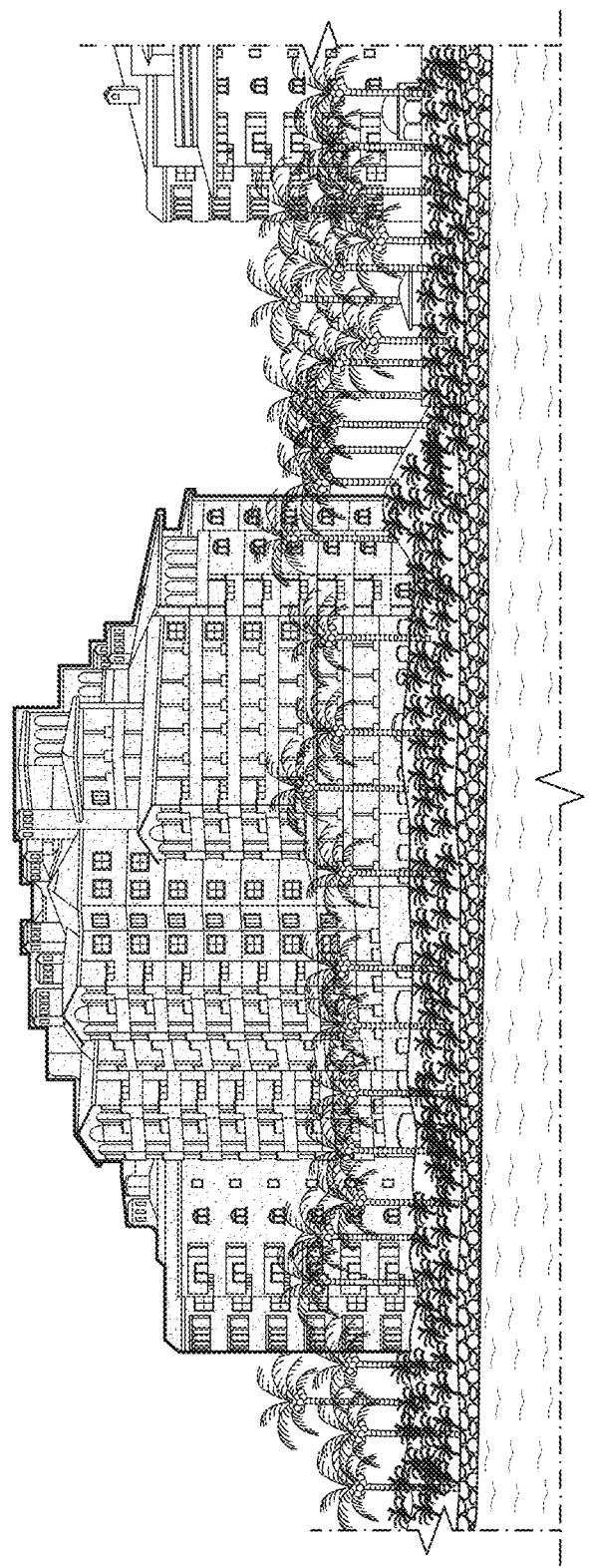
FIG. 6 illustrates the user interface and steps of the real estate system.

Turning to FIG. 2, FIG. 2 is a block diagram showing various components of one embodiment of a computing device 110. Computing device 110 may comprise a housing for containing one or more hardware components that allows access to edit and query server 300. Computing device 110 may include one or more input devices such as input devices 265 that provide input to a CPU (processor) such as CPU 260 of actions related to user 115. Input devices 265 may be implemented as a keyboard, a touchscreen, a mouse, via voice activation, a wearable input device, a camera, a trackball, a microphone, a fingerprint reader, an infrared port, a controller, a remote control, a fax machine, and combinations thereof.

Actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 270 may also comprise a touch screen interface operable to detect and receive touch input such as a tap or a swiping gesture. Other I/O devices such as I/O devices 275 may also be coupled to the processor, such as a network card, video card, audio card, USB, Fire Wire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programing interface (API), such as API 286, and other computerized programs or application programs such as application programs 288. Memory 280 may also include data memory such as data memory 290 that may include database query results, configuration data, settings, user options, user preferences, or other types of data, which may be provided to program memory 282 or any element of computing device 110.

Computing device 110 may have a transmitter 295, such as transmitter 295, to transmit data. Transmitter 295 may have a wired or wireless connection and may comprise a multi-band cellular transmitter to connect to the server 300 over 2G/3G/4G cellular networks. Other embodiments may also utilize Near Field Communication (NFC), Bluetooth, or another method to communicate information.

Computing device 110 may have one or more primary cameras on housing of computing device 110 whereby primary cameras may have one or more lenses, one or more sensors, a photosensitive device, and one or more LED flash lights whereby images and video may be captured. For example, the cameras may capture pictures or video from a 360-degree field of view which may then be received by computing device 110 and server 300. The cameras may utilize sensors such as a charged-coupled device (CCD) or Complementary Metal-Oxide Semiconductor (CMOS) to sense a captured scene. The sensors in the camera may capture light reflected from the scene taken and translate the strength of that light into a numeric reading by passing light through a number of different color filters whereby the readings are combined and evaluated via software to determine the specific color of each segment of the picture.

Eyeglasses may be configured so that users 115 may interact with a virtual or augmented reality view by inserting annotations, comments, virtual objects, pictures, audio, and video to locations within range of computing device 110. The virtual objects may include virtual characters or static virtual objects and any other virtual objects that can be rendered by the augmented reality networking system built within virtual interactive real estate system 100. These interactions may be viewed by other users 115a and 115b who may also build upon the interactions or make additional interactions that then may be seen by the original user or a third user.

Users 115a and 115b may initially register to become a registered user 115 associated with real estate system 100 whereby the users may have an associated user profile that includes automatically stored data corresponding to the interactive location for later viewing. Real estate system 100 may be downloadable and installable on computing device 110. In one or more non-limiting embodiments, real estate system 100 may be preinstalled on computing devices 110 by the manufacturer or designer and integrated or connected to other applications. Server 300 may associate computing devices 110 with an account during the registration process.

When users 115a and 115b initially register to become a registered user of real estate system 100, users 115a and 115b may be prompted to provide some personal information along with a requested account name and password, such as, without limitation, their name, age (e.g., birth date), gender, interests, contact information, home town, address, their visual capabilities such as only being able to see out of the left or right eye as well as other preferences.

Users 115 may be requested to take pictures of themselves whereby server 300 collects and stores pictures of each user in a database to display to other users 115, for example, through a user interface 125 of computing device 110. Pictures may be for identification purposes during navigation of a session and to enhance the authenticity of the process by ensuring that the picture is of the correct, intended user when interacting with other users 115. User 115 may couple, link, or connect with user accounts from social networking websites and internal networks. Examples of social networking websites include but are not limited to Instagram®, Facebook®, LinkedIn®, Snapchat®, and Twitter®. Server 300 may use access tokens or other methods as a parameter for searching for a friend list or address book of users on a social networking site or other site. Server 300 then may use this friend list information to initialize a contact list database for users stored within server databases.

In some embodiments, when registering a user account, real estate system 100 may allow users 115a and 115b to access and interact with real estate system 100 using login credentials from other social networking platforms. For example, in some embodiments, it may be useful and convenient for users of real estate system 100 to be able to log in using credentials or sign in information from another social media application, such as Facebook® or Instagram® or the like. This is advantageous for users who do not wish to have to learn or provide multiple types of login information.

Real estate agents who also may be users 115 may register a business associated with real estate system 100 such that their services may be available to users 115 in the virtual environment whereby their third-party systems are connected to real estate system 100 such that users 115 do not have to leave the application to contact the real estate agents. Any user 115 may also register a business associated with system 100, such that their services may be available to users 115 to acquire services for themselves. This may also be for partnerships with other third-party programs.

In one or more non-limiting embodiments, server 300 may create one or more locally based community networks designed for specific areas of real estate, stored on databases whereby users 115 may be associated with a specific geographic location to find specific real estate agents that operate in the area. The term "locally based" used in this disclosure may mean community, city, town, township, municipality, county, state, country, continent, etc. as well as any other community networks. User interface 125 may provide multiple ways to login such as a private login where users 115 may interact with other users 115 in a specific locally based community network and have information presented specifically tailored to them. There may also be a public login whereby users 115 may interact with all other users 115 that are of any geographic distance or location. User interface 125 may provide connection information about users 115, such as names, photos, activities, interests, and relationship to other users 115 who are in the location-based community network when privately logged whereby this information cannot be accessed when publicly logging on to real estate system 100.

Server 300 may coordinate an interactive virtual location for a real estate property allowing other users 115 to participate and interact with the property. In some embodiments, user interface 125 may present through user interface 125 an invitation to join one or more interactive virtual locations. Virtual locations may be searchable and/or filtered. Interactive events may be a scheduled event and the plurality of users 115 may join the scheduled event by accepting a request the event published.

Server 300 may include a map generation engine, which may be leveraged by one or more users 115 to capture, generate, or otherwise obtain area data related to an area of interest. Among other suitable data, area data could comprise image data (e.g., still image data, real-time image data, etc.), video data, signal data (e.g., CSS data, RSS data, Wi-Fi signal data, beacon signal data, etc.), and/or initial maps that may be transmitted to and stored in area database 350 via network 400. Server 300 may include an AR management engine, coupled with area database 350 via network 400, can be configured to obtain an initial map related to a physical area from database 350 or could be configured to obtain other area data and generate an initial map based on the obtained data.

Contemplated physical areas may include all suitable interior and exterior settings. Examples of indoor settings can include a casino, an office space, a retail space, an arena, a school, an indoor shopping center, a department store, a healthcare facility, a library, a home, a castle, a building, a temporary shelter, a tent, an airport terminal, or any other interior setting. Examples of outdoor settings can include a stadium, a park, a wilderness area, an arena, a road, a field, a route, a highway, a garden, a zoo, an amusement park, the outside of an airport, the outside of a cruise-ship, a sight-seeing tour, a rooftop, or any other outdoor setting.

Server 300 may have a location module that may be configured to determine the location of one or more users 115 for viewing of the properties. The location may be determined directly by a variety of sensing components such as optical cameras and infrared (IR) cameras, global positioning system, accelerometers, compass, wireless networks, or Bluetooth. The location component may determine a user's location while user 115 is moving from one physical location to the next physical location with their computing device such as a phone while traveling.

In one or more non-limiting embodiments, one or more sensors or cameras or GPS may be used by a location module to track the x y z coordinates of the user. In some embodiments, the location component may indirectly receive location information from computing device 110. The location component may receive location information from the second computing device 110 via wireless networking, hotspots, Bluetooth, or other means. The location component may then determine location information of the user based on the received information from a computing device 110. The cameras may also determine the location based on location of the body and face of a user when viewed using one or more sensors. The distance of the computing device 110 from the user's eyes may also be determined to calculate and adjust location information accordingly.

As illustrated in FIG. 3-6, after accessing and registering with real estate system 100, users 115 may search for real estate properties to view and then connect with one or more real estate applications or platforms to interact with or purchase via a real estate agent.

During operation, user 115 may have a plurality of ways presented to search for real estate listings on real estate system 100. User interface 125 may present to user 115 a search window whereby a search request having a character string may be entered where one or more locations may be identified using name, type of business, or other information pertaining to venue or other physical location.

Users 115 may input additional text or changes to the existing search request through user interface 125 to receive an updated list of locations based on the newly entered text. The search request may also include other parameters, such as categories, distance, and already visited locations. Further, in some embodiments, these parameters as well as others may be automatically factored in when a search request is conducted based on previous data of users 115. User interface 125 may provide the ability to adjust and select parameters that may be used to filter and/or rank the results of the location displayed to the users 115.

Real estate system 100 may provide an authenticated API to interpret the natural language input from the user. Other data may be inputted such as audio, photos, or video. Real estate system 100 may utilize large language models that were pre-trained with extensive datasets, including books, websites, and other text sources to learn language patterns, grammar, facts, etc. Once trained, the real estate system 100 may utilize large language models to generate coherent and contextually relevant text based on the prompts they receive from the user and can maintain a dialogue with the user, providing responses that are contextually relevant to the input they receive. Large language models 102 may utilize a number of machine learning models such as neural networks having layers of interconnected nodes that can process input data and produce output. An example neural network is an encoder-decoder neural network. The encoder starts by converting each word in the input text into a vector using an embedding layer. These embeddings capture the semantic meaning of each word. Positional encodings may be added to the input embeddings to provide information about the position of each word in the sequence.

A multi-head self-attention mechanism may then be used to allow the model to weigh the importance of different words in the input sequence differently. Each 'head' in the multi-head attention mechanism performs attention independently, allowing the model to capture different types of relationships between words. After the self-attention mechanism, layer normalization is applied. Also, residual connections are used, which means the input of each sub-layer is added to its output. This helps in mitigating the vanishing gradient problem in deep networks.

Each layer of the encoder may also include a position-wise feed-forward neural network, applied to each position separately and identically. This network includes fully connected layers with activation functions. Multiple such encoder layers are stacked on top of each other. Each layer operates on the output of the preceding layer.

During use, the text input is converted into a set of vectors through the embedding and positional encoding steps. These vectors are then passed through the multi-head self-attention mechanism, where the model learns to focus on different parts of the input sequence. The output of the attention mechanism is then normalized and passed through the feed-forward neural network. The process is repeated for each encoder layer, with the output of one layer feeding into the next. The final output of the transformer encoder is a set of vectors, one for each input token.

Heuristics and Large Language Models (LLMs) may also be used to clean up data by automating the process of identifying and rectifying errors, inconsistencies, and other issues in datasets. Heuristics may be used to define rules and checks for data validation whereby data may be stored in a specific format. Heuristics may also verify that the data types of values in the dataset match the expected data types whereby the process may be repeated or data eliminated if it deviates too far from the expected types.

In some non-limiting embodiments, user interface 125 may provide an automatic or manual search mode with an on/off mode via a user selectable button or interface command whereby when in the "off" mode, users 115 may view neighborhoods and points of interest. While in the "on" mode in augmented reality before or while or after navigating a real physical environment, user interface 125 may permit users 115 to enter various criteria that may be used in a search for real estate listings. The viewfinder in user interface 125 will then highlight any properties that meet the various criteria with one or more colors whereby the colors may be designated to a specific color based on the search criteria.

In one or more non-limiting embodiments, the more criteria factors that are met by a real estate listing the brighter the color of the property may appear in the augmented reality view. When user 115 is not using real estate system 100 such as when they have another application open or their computing device is in standby mode, real estate system 100 may transmit a push notification (may be in the form of a vibration, light sound, or screen effect) to the computing device that a property meeting one or more of the criteria is within a predetermined range to the computing device. User 115 may then open real estate system 100 whereby the system may then direct user to find the property with directions or large indicator arrows that point to the property. The criteria may be saved for later viewing or can be used in real time by users 115 at their convenience. The viewfinder may also specifically highlight any properties associated with a real estate agent or brokerage that are connected to real estate system 100. This may also be presented when connecting with a real estate agent through video.

An augmented reality view of the surrounding area based on the user's location may then be presented to users 115 once the criteria is selected or if the user is browsing their location generally without search filters. While in this view, users 115 may see which neighborhood they are in, specific addresses, building names with information including the year built, number of floors, as well as the status including active (sale), active (rent), sold (sale), and sold (rent) while interacting with user interface 125. For example, once users 115 click on a specific building, general information may appear (name, address, number of units, price etc.) as well as if the location is active (rent, sale), pending, or closed. Areas that users 115 may not be able to see, such as around the corner, may also be seen by users 115 whereby user interface 125 may present these locations using a different color or with dotted lines.

Real estate system 100 may natively have Object Character Recognition (OCR) technology (one or more of the computer vision technologies) that may detect and recognize one or more types of real estate properties or buildings displayed in the augmented reality view from current databases of property listings in real estate system 100 from real estate accounts/websites and third-party sites such as public depositories and may use any technology currently implemented or known by those of ordinary skill in the art. For example, in some embodiments OCR is a task in computer vision that involves identifying the presence, location, and type of the one or more buildings in the given image. Real estate system 100 may also cross reference other information such as by web crawling addresses, social media, or records and cross reference where the user is located at presently using GPS to identify the location or property viewed in augmented reality based on the address and the location of the user and the positioning of the phone. This may be done alternatively or bolster the previous methods of identification.

Real estate system 100 may analyze the image metadata (e.g., alt text, title attributes) then utilizing image recognition algorithms or APIs. Real estate system 100 may also apply pattern matching or regular expressions to detect received images from the augmented reality view. Real estate system 100 may then store the results by saving the image, along with any relevant metadata or contextual information, in a structured format such as a database, CSV file, or JSON file.

Once stored the images may then be converted into numerical vectors that can be used for various machine learning and computer vision tasks. Images may be resized to a consistent resolution to have consistent dimensions. Pixel values may be scaled to a common range (e.g., [0, 1] or [−1, 1]) to have similar intensity characteristics. During the process of modifying the image into a vector the pixel values of the image may be flattened to be used as a vector whereby the intensity of each pixel becomes an element in the vector. The histograms of pixel intensity values may then be computed for different color channels (e.g., red, green, blue) or color spaces.

Real estate system 100 may utilize any number of deep learning models which can be trained to automatically extract hierarchical features from images and convert them into embedding vectors that can be used for the search algorithm. This deep learning system could be an encoder-only or an encoder-decoder neural network. The input to the encoder may be any number of images in different formats. The encoder may include Convolutional Neural Network (CNN) or a Transformer architecture for processing images, capturing spatial hierarchies, and extracting features. The layers of the CNN (convolutional layers, pooling layers) or Transformer (attention layers, fully-connected layers) may progressively reduce the spatial dimensions of the image while increasing the depth of the feature maps. The output of the encoder may be a compact representation of the input image in the form of a context vector which encodes its significant features. Optionally, there could be a decoder that transforms the encoded information into a new format, e.g. The decoder may be a transformer that generates a textual description of the image in a standardized format such that it may be compared to other consumer items.

The machine learning model may be based on the CLIP (Contrastive Language-Image Pretraining) architecture and loss function that learns a joint embedding space for language and image. This enables searching across both domains in the same search index, e.g., using text inputs (e.g., natural language search queries) to retrieve from a search index of images or using image inputs to retrieve from a search index of text. Moreover, the machine learning model may be a foundation model that is pre-trained on millions or even billions of data points. In the case of CLIP, it would be a large dataset of both images and captions. In addition, the machine learning model can be fine-tuned specifically for the real estate domain by collecting a dataset of real estate images and corresponding descriptions that enables the model to have a better representation of real estate concepts like building type, use, cost or category. The captions for the images may be synthetically generated from the partner data. The fine-tuning may use the CLIP loss function or any other loss function that is compatible with the choice of machine learning model architecture.

As discussed, real estate system 100 may receive a search request from computing devices 110. The search request may include a real estate image that user 115 is viewing in the augmented reality. The search request may additionally or alternatively include one or more search criteria filters to narrow the field of the search implemented by computing device 110. Real estate system 100 may store the subject image and/or the search request in a file location in database associated with the specific user 115. real estate system 100 then may perform image recognition or analysis on the subject image using object character recognition as well as sorting, standardization, and translation into vectors to determine the identity of the location or property and data pertaining to the location or property.

User interface 125 may store information pertaining to locations for further use and training such as the ones that users 115 have visited. Users 115 may save additional buildings to a stored virtual environment and then revisit the buildings later. This may be done automatically by the user viewing the information of a location for a predetermined amount of time such as a minute or manually chosen by the user. This is designed so that users 115 may obtain information concerning multiple listings in the area as they are passing through while driving or walking. Real estate listings may be transmitted directly to a separate virtual world of the users 115 through real estate system 100 and to a real estate agent to create a collection for further inspection such as when the user is home browsing and wants to discuss later with the real estate agent whereby for the present while passing through it may be downloaded for offline viewing into their virtual world.

In some embodiments, the stored locations may be updated based on the current date and time to correspond with the current weather conditions and sunlight or other external factors such as rush hour, whereby real estate system 100 virtually creates the image using deepfake or AI technology whereby the system is trained to constrain generation of an output image based on the input image such that the output image appears to depict the subject of the input image. Real estate system 100 may have an image generator that may be part of a generative adversarial network that is trained by concurrently training the generator to generate images and concurrently training a discriminator to determine whether images are real or not real, correspond to the image from the rendered version of the image, and correspond to the identity of the subject from the reference image. Real estate system 100 may also collect other images of the location from other users to display variant images to the user.

After selecting a property that is associated with a real estate agent, server 300 may provide display information pertaining to an accompanying real estate agent or firm through a connection application. User interface 125 may provide the option to initiate a session on real estate system 100 with a real estate agent. Once communication has been established, users 115 may interact with and communicate with real estate agents through user interface 125 as well as browse and select goods or services provided as possible selections that are associated with the real estate agent's profile that may be stored in the databases as well as view one or more previous, favorite services by users 115. These selections may be displayed through a list or a drop-down menu on user interface 125.

Real estate agents may also broadcast real time streaming video whereby server 300 transmits live or archived video content over network 400 that may be accessed by other computing devices 110 which may be associated with a specific location or a series of locations in a neighborhood. Server 300 may receive a request to share video or audio content with one or more users 115 that has been captured by the camera and/or speaker of computing device 110 by the real estate agents.

The request for sharing video or audio content may be received through server 300 whereby server 300 provides an instance of the video or audio content in response to the request. In response to the request for sharing, server 300 retrieves the video or audio content at the time the request for sharing was received. The instance of the video or audio content, based on the information retrieved, includes the current video or audio content and other attributes of the video or audio content of user 115*a* who initiated the sharing of the video or audio content. Server 300 may also store video or audio from first user 115 as well as still images from the video. Server 300 may use any number of encoders known by those of ordinary skill in the art which format the video and audio signals for streaming delivery to users 115 such as user 115*a*.

In some embodiments, users 115 may be presented a calendar interface after selecting a location or property whereby they may set up a future meeting with a real estate agent pertaining to that property such that server 300 may initiate the communication at the specified time. Server 300 may generate synchronization messages, such as an email message, text message, or calendar invitation for each user 115 related to future meetings, such as Microsoft Outlook and Google Calendar. In one implementation, the synchronization message may include a calendar data exchange file, such as an iCalendar (.ics) file in compliance with IETF RFC 5545.

Real estate system 100 may utilize many different advertising techniques used by registered locations or venues, as well as any real estate agents. When a user 115 is within a predetermined distance of a venue or physical location, an automated advertisement procedure may be initiated for presentation on user interface 125 to users 115. Advertisements may be in the form of offers such as discounts or other incentives presented to users 115 through user interface 125. In one or more non-limiting embodiments, metrics may be utilized by server 300 to only present advertisements to users 115 such as, but not limited to, users 115 who have not visited the venue or physical location before (a user with zero "check-ins") or users 115 of a certain demographic such as age, profession, or ranking.

The real estate system provides a new and improved method that allows the user to scan their surroundings and immediately know valuable information as to neighborhood listings. It decreases time and stress for the user by combining all features into one app plus it links directly with an agent to help the search.

During use, the first step is for the user to open real estate system 100 and, after activating camera mode, scan their surroundings. Real estate system 100 may first tell the user the neighborhood (general info) and can take the user to points of interest, restaurants, special events etc. on a second setting. The main use is to scan buildings, homes in the first setting. Once the user clicks or selects the specific building, general information will appear (name, address, number of units, etc.). Next the user can see what listings are active (rent, sale), pending, or closed in an augmented view. Here, the user may link with a real estate agent to help them with their search and showing requests.

In one example, a user 115 logs into an application using face recognition or automatically in a third-party application. User chooses type of View A, B or C. View A may be a general user tourist mode showing neighborhood points of interest (promoted restaurants, cafes, shops, convenience stores, hospitals, schools, etc., which can be paid advertisers). View B may be an active, specific viewer whereby user 115 will enter criteria such as rent or buy, price point, high-rise, single family etc., pending, active, closed status). At this point, the search will recognize the location and coordinates using one or more large language models). The search engine connected to the brokerage will automatically pull up properties that fit the criteria. Users can then save specific listings/buildings to a collection for later viewing and connect directly with real estate agents. This active, specific view mode is for the person who is an active searcher and has a mission to find a property to buy/rent. View C may be designed for the viewer who wants the search capability but does not necessarily have an active search going on, but may simply be curious to see what specific buildings are on the market with no real intention of connecting with an agent. They would still need to create an account in real estate system 100 in order to access.

This search capability may be very user friendly and very visual. There is no need to type in an address (although there is a search bar if the user wants a specific address and information of properties within). In general, the user obtains information by scanning the properties in front of them which then may be identified by the system using any number of algorithms previously discussed. If in View B mode, the search will show any other available properties matching the user's 115 criteria that are within a certain radius. (Again, these results can be saved to a collection folder of saved properties and can be shared with an agent for further discussion.)

As shown in the figures, real estate system 100 may highlight the outline of the exterior of the building so what the user sees on his phone syncs with the data that real estate system 100 pulls up in real time. There is a visual connection which leads to accurate and real time data. As the user scans their view, each building that comes into view will be highlighted and basic information given (name of building, address, general stats, etc.). In some embodiments, the user 115 may trace the location that is visible to receive information about it or save it for later. It can also be saved for later viewing or passed by, and the viewer continues to the next property and the property after that. Real estate system 100 is designed to be very user friendly. In some embodiments, there may be tabs for each prompt (for example, the user will enter criteria by moving the toggle for "rent" or "buy" and for pricing the user will adjust the slide from minimum to maximum price (much like is seen when searching for a property on Airbnb and giving a range of higher to lowest). Every criteria and capability will be reached with a touch of the screen (except for the initial input of users name email, contact information, etc.). Even the name of the real estate agent will be in a drop-down menu. There may be a drop-down menu for number of rooms, SQFT, and any other criteria. Real estate system 100 provides super visual and easy capabilities, requiring no more typing in information to get data. When the user 115 'favorites' a building, an alert will sound on the phone any time there is a new match for that building or that criteria within a predetermined radius while the user 115 is walking, whereby houses with one or more criteria set by the user 115 may be displayed in a virtual world.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. An interactive real estate system, comprising: an augmented reality display, a multi-lens camera array with one or more sensors for capturing images and video, audio and video modules for real-time communication, a network interface for streaming video content, at least one processor; a communication interface, controlled by the at least one processor, to communicate with a computing device; and a memory having stored therein machine executable instructions, that when executed by the at least one processor, causes the interactive real estate system to:
   receive, via the communication interface, a collection of user information generated from an application in the computing device of a user, the collection of user information comprising information generated by a GPS module associated with the application;
   determine context-based information from the collection of user information, the context-based information generated based on user-specified search criteria;
   identify real estate properties currently being displayed in a live camera view on the augmented reality display using Object Character Recognition (OCR) models and neural network models including encoder-decoder networks trained on real estate data;
   generate an augmented reality view by overlaying virtual objects containing real-time property information onto the identified real estate properties in the live camera view;
   modify a visual representation of a specific property matching the user-specified search criteria by applying a highlighting effect to that specific property in the augmented reality view;
   display the augmented reality view with the modified visual representation through a user interface of the computing device; and update the augmented reality view in real-time as the user moves the computing device to change the live camera view;
   provide a user-selectable toggle to switch the augmented reality view between: a general mode showing neighborhood points of interest, a targeted mode showing only properties matching the user-specified search criteria, and a market overview mode showing all properties for sale or rent;
   receive real-time video and location data from the multi-lens camera array and the GPS module;
   process the real-time video using the neural network models including the encoder-decoder networks trained on the real estate data to detect and identify buildings in a video feed, extract architectural features and building characteristics, and match detected buildings to property database records;

determine precise spatial positioning of the detected buildings using GPS coordinate data, building recognition algorithms, and real-time location tracking;

generate and display augmented reality overlays by highlighting building outlines in the video feed, anchoring virtual property information to recognized buildings, and updating display positions as the user moves;

establish secure video conference connections by initiating real-time streaming with real estate agents; encoding video and audio signals for streaming delivery, integrating the video conference feeds into the augmented reality view, and enabling the real estate agents to interact with users through the augmented reality interface;

synchronize property viewings through calendar integration for scheduling virtual meetings, automated meeting notifications, and secure video streaming for virtual events;

maintain accurate overlay positioning using continuous GPS location updates, real-time video processing and spatial tracking algorithms;

automatically adjust information displays based on current viewing distance, building recognition confidence, the user-specified search criteria matches; and update the augmented reality view in real-time as the user moves through an environment.

2. The interactive real estate system of claim 1, wherein the interactive real estate system is further caused to:

establish a video conference connection having a video conference between the user and a real estate agent associated with a selected property in the augmented reality view;

integrate the video conference into the augmented reality view, allowing the user to communicate with the real estate agent while simultaneously viewing the property information; and enable the real estate agent to control certain aspects of the augmented reality view to highlight specific property features during the video conference.

3. The interactive real estate system of claim 1, wherein the interactive real estate system is further caused to:

detect, using the GPS module, when the user is within a predetermined radius of a property matching the user-specified search criteria that is not currently visible to the user;

generate directional indicators overlaid in the augmented reality view; and update the directional indicators in real-time to guide the user to a location of the property matching the user-specified search criteria.

4. The interactive real estate system of claim 1, wherein the interactive real estate system is further caused to:

automatically capture and store detailed property data from the augmented reality view when the user views the specific property for a predetermined time period; and organize the stored property data into a personalized digital portfolio for the user; and make the digital portfolio available for offline viewing and analysis.

5. The interactive real estate system of claim 1, wherein the interactive real estate system is further caused to:

continuously monitor real estate listings using the user-specified search criteria; detect when a new property matching the user-specified search criteria becomes available within a specified radius of a current location of the user; and generate and transmit a real-time alert to the computing device, including an option to immediately view the new property in the augmented reality view.

6. The interactive real estate system of claim 1, wherein the interactive real estate system is further caused to:

receive user input specifying desired property modifications; generate, using an generative adversarial network, artificial views of the specific property incorporating the desired modifications; and display the artificial views within the augmented reality view, allowing the user to visualize potential renovations or alterations in context of different time periods.

7. The interactive real estate system of claim 1, wherein the interactive real estate system is further caused to:

automatically save the user-specified search criteria in one or more databases for next viewing.

8. The interactive real estate system of claim 1, wherein the interactive real estate system is further caused to:

save user specified multiple search criteria in one or more databases for toggling views.

9. The interactive real estate system of claim 1, wherein the real-time property information includes general information including name, address, number of units, and price.

10. The interactive real estate system of claim 1, wherein the interactive real estate system is further caused to:

present a calendar interface after selecting a location to set up a future meeting with a real estate agent pertaining to that property.

* * * * *